W. J. KEARY.
FASTENER.
APPLICATION FILED DEC. 1, 1910.

1,040,957.

Patented Oct. 8, 1912.

Witnesses
L. Helen Fowler
A. F. Kitchin

Inventor
William J. Keary
By Mason Fenwick & Lawrence
his Attorneys

UNITED STATES PATENT OFFICE.

WILLIAM J. KEARY, OF SCHENECTADY, NEW YORK.

FASTENER.

1,040,957.  Specification of Letters Patent.  Patented Oct. 8, 1912.

Application filed December 1, 1910. Serial No. 595,132.

*To all whom it may concern:*

Be it known that I, WILLIAM J. KEARY, a citizen of the United States, residing at Schenectady, in the county of Schenectady and State of New York, have invented certain new and useful Improvements in Fasteners; and I do hereby declare the following to be a full, clear, and exact description of the invention, such as will enable others skilled in the art to which it appertains to make and use the same.

This invention relates to improvements in clasps, fasteners and the like, and has for an object the arrangement of improved means for preventing the accidental disengagement of the device.

Another object of the invention is the arrangement in a clasp, of an improved retaining structure in combination with a stud which permits the stud to be forced into place but resiliently resists its removal.

A further object of the invention is the arrangement of a stud and socket member, the socket member being formed with a retaining portion and a resilient tongue portion, the retaining portion being formed with a stud receiving aperture and a slot radiating therefrom, whereby the stud is permitted to be inserted in the socket member and then moved laterally into the slot, the spring resisting the movement of the stud into the retaining member and resisting its removal from the slot.

With these and other objects in view the invention comprises certain novel constructions, combinations, and arrangement of parts as will be hereinafter more fully described and claimed.

Figure 1:
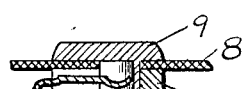
Figure 2:
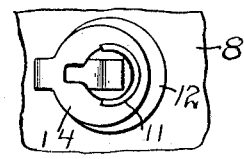
Figure 3:
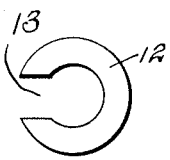
Figure 4:
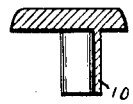
Figure 5:
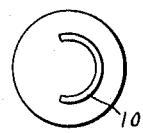
Figure 6:
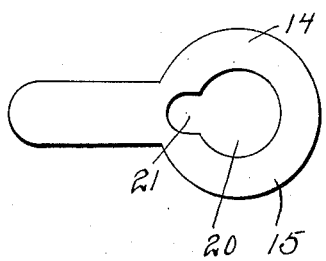
Figure 7:
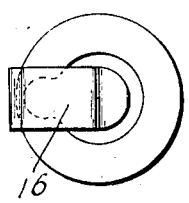
Figure 8:
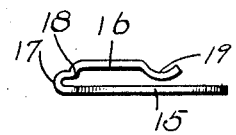
Figure 9:
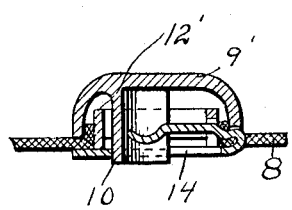
Figure 10:
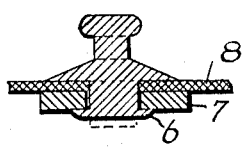
Figure 11:
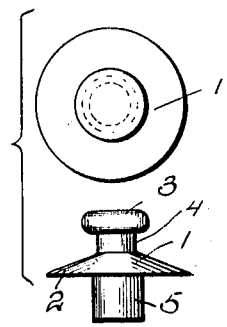

In the accompanying drawings: Figure 1 is a longitudinal vertical section through an embodiment of the invention shown in position. Fig. 2 is a bottom plan view of the device disclosed in Fig. 1. Fig. 3 is a plan view of a ring open at one point, embodying certain features of the invention. Fig. 4 is a longitudinal vertical section through a socket portion of the clasp. Fig. 5 is a bottom plan view of the structure shown in Fig. 4. Fig. 6 is a plan view of a blank of a spring retaining member embodying certain features of the invention. Fig. 7 is a plan view of the spring retaining member folded ready for use. Fig. 8 is an edge view of the structure shown in Fig. 6. Fig. 9 is a longitudinal vertical section through a slightly modified form of the invention. Fig. 10 is a longitudinal vertical section through a stud which may be used either with the preferred or modified form of the invention. Fig. 11 is a plan view and edge view of a stud member before the same has had the lower end upset.

In forming a clasp embodying the invention a stud structure is provided arranged with a head and neck or reduced portion, together with means for clamping the stud in place, and a socket portion arranged with a stud receiving spring member designed to receive and hold the stud in proper relation to the socket member until manually removed. This spring member comprises a plate formed with a tongue bent to extend over the plate. The plate portion of the spring member is provided preferably with a circular aperture and a slot radiating therefrom, the aperture being of sufficient size to permit the passage of the head of the stud therethrough, and the slot being of a size sufficient only for accommodating the neck of the stud so that whenever the neck of the stud is moved over into the slot the stud cannot be removed without a reverse motion, and the reverse motion is resisted by the turned over portion of the spring member.

In order that the invention may be more clearly understood an embodiment of the same is shown in the accompanying drawings, in which 1 indicates a stud having a flaring portion or apron 2 and a head 3, the apron and head being connected by a neck or reduced portion 4. Extending from the apron 2 is a rivet member 5 which may be upset or riveted at 6 (Fig. 10) so as to clamp ring 7 properly in position for pinching the leather or other material 8 properly for holding the stud in position.

The socket member (Figs. 1 and 4) is formed with a base 9 having a semi-tubular extension 10 designed to be turned over at 11 for clamping a ring member 12 in position in the same manner that ring 7 is clamped in position. Ring member 12 is open or cut at point 13 for permitting the proper positioning and action of the spring member 14. The upsetting or riveting of member 10 at 11 thoroughly clamps the socket member properly to the article 8 so that a socket member and stud member are thus adapted to hold the article 8 together when the stud is positioned in the socket. The spring member 14 is formed with a plate portion 15 and a spring portion 16. The spring portion 16 is bent at points 17 and 18, and also at point 19, so as to be positioned opposite stud opening 20 and the slot 21 for resisting the entrance and removal of the stud 1. The spring portion 16 is bent down at point 19 but between points 19 and 18 the same is sufficiently elevated to accommodate the head 3. By this structure when head 3 is forced in the socket the same must move the spring at point 19 away from plate 15 a sufficient distance for the entrance of the head 3 before the reduced portion or neck 4 can enter slot 21.

In arranging the stud and socket on an article, as for instance shoes, gloves and the like, the stud is connected with one part of the article and the socket with the other. The socket is so attached that normal strain, after the fastening of the glove, will tend to cause the stud to enter slot 21. The spring portion 16 will prevent the accidental removal of the stud from the socket, especially in view of the fact that the same is bent down at point 19 and forms a yielding stop or abutment.

Referring more especially to Fig. 9, it will be observed that the same discloses a slightly modified construction in which ring 12 is eliminated, but a ring 12' substituted. The socket member is also formed with a base 9' substantially cup-shaped, and into which is placed ring 12'. The ring 12' is of such a size as to clamp the material 8 between the same and the lower edge of base 9' in order to hold the socket properly in position. The spring member 14 also assists in clamping and holding in position the material 8 when member 10 is upset or riveted.

What I claim is:

1. In a fastener of the class described, a socket device coöperating with a stud and formed with a partly cylindrical member, a spacing and housing member held in place by the partly cylindrical member, and a stud retaining member comprising a plate and a spring member, the plate being apertured and having one flat side adjacent to the spacing member and having a slot extending from the aperture for accommodating the neck portion of the stud, the spring member projecting into the partly cylindrical member for resisting the entrance and removal of the head of the stud.

2. In a fastener of the class described, a socket device coöperating with a stud and formed with a substantially semi-cylindrical member, and with flanged sides extending substantially parallel with said member, a housing partly inclosing said member, and spaced therefrom and from the sides of the socket device for assisting in clamping the housing to an article, and a stud retaining member comprising a plate having an aperture therein, one flat side of the plate being adjacent to the housing, and the plate having a slot extending from the aperture and a turned over portion extending across the aperture and into the semi-cylindrical member, for resisting the entrance of the head into the socket and resisting the lateral movement of the reduced portion with reference to the aperture and slot.

In testimony whereof I affix my signature in presence of two witnesses.

WILLIAM J. KEARY.

Witnesses:
HANFORD ROBISON,
B. M. CHAMBERLAIN.

---

Copies of this patent may be obtained for five cents each, by addressing the "Commissioner of Patents, Washington, D. C."